United States Patent
Hui et al.

(10) Patent No.: US 10,019,425 B2
(45) Date of Patent: Jul. 10, 2018

(54) ENHANCEMENT TO TEXT SELECTION CONTROLS

(71) Applicant: QUALCOMM Incorporated, San Diego, CA (US)

(72) Inventors: Shiu Wai Hui, Richmond Hill (CA); Veluppillai Arulesan, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 14/678,631

(22) Filed: Apr. 3, 2015

(65) Prior Publication Data

US 2016/0292139 A1    Oct. 6, 2016

(51) Int. Cl.
   *G06F 17/24*    (2006.01)
   *G06F 3/0484*   (2013.01)
   *G06F 3/0488*   (2013.01)

(52) U.S. Cl.
   CPC ............ *G06F 17/24* (2013.01); *G06F 3/0488* (2013.01); *G06F 3/04842* (2013.01)

(58) Field of Classification Search
   CPC ..... G06F 3/04842; G06F 3/0488; G06F 17/24
   USPC ........................................................ 715/256
   See application file for complete search history.

(56) References Cited

U.S. PATENT DOCUMENTS

| | | | |
|---|---|---|---|
| 8,650,507 B2 | 2/2014 | Westerman et al. | |
| 8,656,296 B1 | 2/2014 | Ouyang et al. | |
| 8,704,783 B2 | 4/2014 | Davis et al. | |
| 8,896,552 B2* | 11/2014 | Tan | G06F 3/0488 345/173 |
| 9,292,161 B2* | 3/2016 | Carter | G06F 3/04812 |
| 9,612,670 B2* | 4/2017 | Weir | G06F 3/033 |
| 2010/0171713 A1* | 7/2010 | Kwok | G06F 3/0488 345/173 |
| 2013/0285928 A1* | 10/2013 | Thorsander | G06F 3/0488 345/173 |

(Continued)

FOREIGN PATENT DOCUMENTS

WO    WO-2013149403 A1    10/2013

OTHER PUBLICATIONS

BlackBerry, "How to Move the BlackBerry 10 Cursor to a Specific Location", published Aug. 27, 2013, located at http://helpblog.blackberry.com/2013/08/how-to-move-the-blackberry-10-cursor-to-a-specific-location/, pp. 1-2.*

(Continued)

*Primary Examiner* — Stephen Hong
*Assistant Examiner* — Aaron Bennion
(74) *Attorney, Agent, or Firm* — Haynes and Boone, LLP

(57) ABSTRACT

Systems and methods are disclosed for selecting text displayed on a screen. An example method of selecting text displayed on a screen includes displaying a first widget marking a first boundary of a selected first portion of text displayed on the screen. The method also includes displaying a second widget marking a second boundary of the first portion. The method further includes displaying an extended area including user interface (UI) controls corresponding to the first widget. The method also includes updating, based on a selection of a UI control corresponding to the first widget, a location of the first widget to indicate an updated selection of a second portion of text displayed on the screen. The second portion of text is disposed between the first and second widgets.

19 Claims, 14 Drawing Sheets

(56) References Cited

U.S. PATENT DOCUMENTS

| | | |
|---|---|---|
| 2014/0136969 A1 | 5/2014 | Horiuchi et al. |
| 2014/0181740 A1* | 6/2014 | Gachoka .............. G06F 3/04842 |
| | | 715/802 |
| 2014/0340319 A1 | 11/2014 | Fenton |
| 2014/0372934 A1 | 12/2014 | Pereira et al. |
| 2015/0186351 A1* | 7/2015 | Hicks .................... G06F 17/241 |
| | | 715/232 |
| 2016/0018968 A1 | 1/2016 | Wilson et al. |

OTHER PUBLICATIONS

International Search Report and Written Opinion—PCT/US2016/018967—ISA/EPO—Apr. 25, 2016.

\* cited by examiner

ENHANCEMENT TO TEXT SELECTION CONTROLS

FIELD OF DISCLOSURE

The present disclosure generally relates to computer user interface systems and more particularly to enhancing user interface controls.

BACKGROUND

Mobile devices are ubiquitous and are used to perform many different tasks. For example, a user may use a smartphone to keep track of calendar appointments, send text messages, read and send e-mail messages, browse the Web, etc. The user may read text on the screen, select a portion of text, and want to perform an operation on the selected text. To perform an operation on the selected text, the user needs to be able to select the appropriate text displayed on the screen.

For various reasons, it may be difficult for the user to select the text that she wants. For example, the screen and/or the text displayed on the screen may be small. The user may modify the size of the text by, for example, zooming in on the text and selecting a portion of the text, but this may be inconvenient for the user.

BRIEF SUMMARY

It may be desirable to provide the user with enhanced text selection controls so that the user may more easily and accurately select the text she desires and perform an operation on the selected text. Systems and methods are disclosed for updating a user selected portion of text displayed on a graphical user interface (GUI).

According to some embodiments, a method for updating a selected portion of text includes displaying a first widget marking a first boundary of a selected first portion of text displayed on a screen. The method also includes displaying a second widget marking a second boundary of the first portion. The method further includes displaying an extended area including user interface (UI) controls corresponding to the first widget. The method also includes updating, based on a selection of a UI control corresponding to the first widget, a location of the first widget to indicate an updated selection of a second portion of text displayed on the screen. The second portion of text is disposed between the first and second widgets.

According to some embodiments, a system for updating a selected portion of text includes a display device, a memory, and one or more processors coupled to the memory and display device. The one or more processors are configured to display a first widget marking a first boundary of a selected first portion of text displayed on a screen, display a second widget marking a second boundary of the first portion of text, display an extended area including UI controls corresponding to the first widget, and update, based on a selection of a UI control corresponding to the first widget, a location of the first widget to indicate an updated selection of a second portion of text displayed on the screen. The second portion of text is disposed between the first and second widgets.

According to some embodiments, a computer-readable medium has stored thereon computer-executable instructions for performing operations including: displaying a first widget marking a first boundary of a selected first portion of text displayed on a screen; displaying a second widget marking a second boundary of the first portion of text; displaying an extended area including UI controls corresponding to the first widget; and updating, based on a selection of a UI control corresponding to the first widget, a location of the first widget to indicate an updated selection of a second portion of text displayed on the screen. The second portion of text is disposed between the first and second widgets.

According to some embodiments, an apparatus for updating a selected portion of text includes means for displaying a first widget marking a first boundary of a selected first portion of text displayed on a screen; means for displaying a second widget marking a second boundary of the first portion of text; means for displaying an extended area including UI controls corresponding to the first widget; and means for updating, based on a selection of a UI control corresponding to the first widget, a location of the first widget to indicate an updated selection of a second portion of text displayed on the screen. The second portion of text is disposed between the first and second widgets.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture

III. Enhancements to Text Selection Controls
A. User Selects a Portion of Text
B. Fine-Tune Text Selection
   1. Extended Area Corresponding to the Begin Widget
   2. Extended Area Corresponding to the End Widget
IV. Example Method I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

It may be difficult for a user to accurately select text on her mobile device. For example, mobile device screens may be small and read a location of the user's finger on the screen that was not intended by the user. The present disclosure provides enhancements to text selection controls in order to assist the user in fine-tuning her text selection.

In some embodiments, a method of updating a selected portion of text includes displaying a first widget marking a first boundary of a selected first portion of text displayed on the screen. The method also includes displaying a second widget marking a second boundary of the first portion. The method further includes displaying an extended area including UI controls corresponding to the first widget. The method also includes updating, based on a selection of a UI control corresponding to the first widget, a location of the first widget to indicate an updated selection of a second portion of text displayed on the screen. The second portion of text is disposed between the first and second widgets.

II. Example System Architecture

Figure 1:
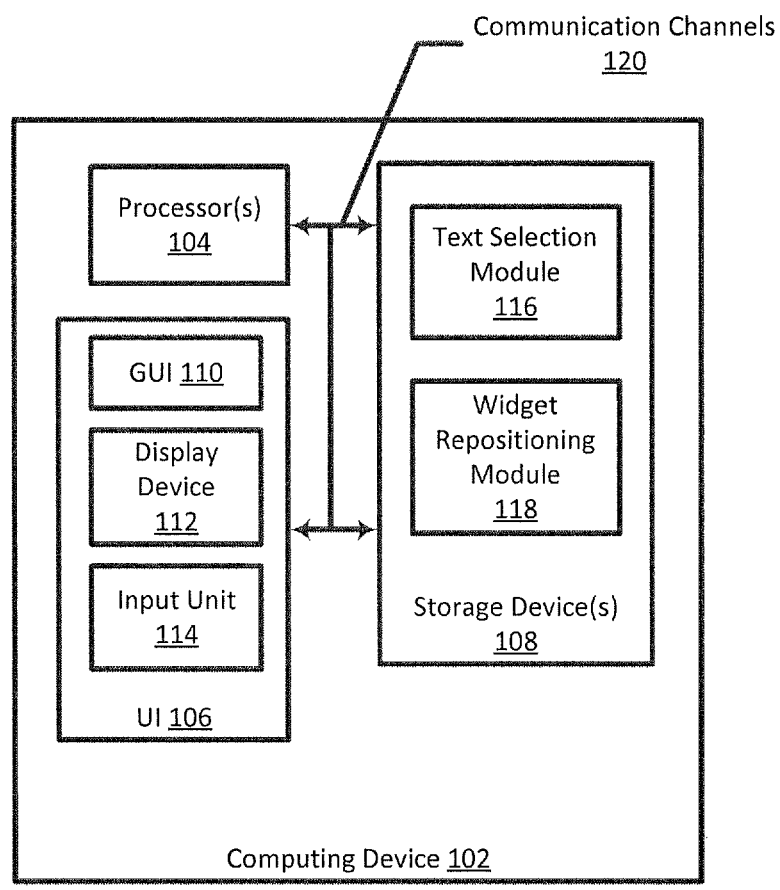
FIG. 1 is a block diagram illustrating an example computing device for updating a user's selected portion of text displayed in a graphical user interface (GUI), in accordance with one or more aspects of the present disclosure.

FIG. 1 is a block diagram illustrating an example computing device for updating a user's selected portion of text displayed in a graphical user interface (GUI), in accordance with one or more aspects of the present disclosure. In some examples, computing device 102 may be a mobile device such as a mobile telephone, a tablet computer, a notebook or laptop computer, a personal media player, a portable gaming device, or another type of computing device designed for mobility. In some examples, computing device 102 may be a stationary computing device such as a desktop computer, television, or another type of computing device. Other computing devices are within the scope of the present disclosure.

Computing device 102 includes one or more processors 104, UI 106, and one or more storage devices 108. Processor 104, UI 106, and storage device 108 are coupled to communication channels 120. Communication channels 120 may interconnect each of processor 104, UI 106, and storage device 108 for inter-component communications (physically, communicatively, and/or operatively). In some examples, communication channels 120 may include a system bus, a network connection, an inter-process communication data structure, or any other method for communicating information data and signals between various components of computing device 102.

UI 106 is a mechanism for allowing a user to interact with computing device 102, or with applications invoked by computing device 102. UI 106 may effect both input and output, allowing a user to manipulate the device or for the device to produce the effects of the user's manipulation. UI 106 includes a GUI 110, display device 112, and input unit 114. UI 106 may be operatively coupled to computing device 102 in a variety of ways. For example, UI 106 may be integrated into a housing of computing device 102 and be connected to computing device 102 via one or more internal connectors. In some examples, computing device 102 is a mobile device, and display device 112 is the screen of the mobile device. In another example, UI 106 may be external to a housing of computing device 102 and may communicate with computing device 102 via one or more external cables and/or communication networks. In some examples, computing device 102 is a stationary device, and display device 112 is a monitor, a television, a liquid crystal display (LCD), a plasma display device, a cathode ray tube (CRT) display, or any other type of display device configured to display text.

Computing device 102 is electrically connected, over a wire-line or wireless pathway, to UI 106, and is configured to control the operation of processor 104 to provide for enhanced text selection control. In some embodiments, computing device 102 uses processor 104 or other control circuitry to execute an application that provides for the enhanced control.

UI 106 may be configured to display text such that a user of computing device 102 may view the text at display device 112. In some examples, an application executing on computing device 102 may display GUI 110 including text 202 in an application window. GUI 110 may be associated with various applications. For example, the application may be a web browser displaying content in a webpage or an e-mail application displaying content of an email message. A widget is a GUI element that a computer user interacts with, such as a window or a text box. GUI 110 may include one or more widgets, and the user may interact with computing device 102 by manipulating the one or more widgets displayed at display device 112.

In some implementations, UI 106 may be configured to display text and/or images associated with an application, such as display text and/or images generated by the application. UI 106 may be implemented using a variety of technologies. For example, UI 106 may be implemented using a resistive touchscreen, a capacitive touchscreen, a surface acoustic touchscreen, a projective capacitance touchscreen, or other touchscreen technology. Input unit 114 detects the presence of one or more objects (e.g., finger or stylus) within a proximity to the display device. In an example, input unit 114 is incorporated into display device 112, and display device 112 is a presence-sensitive display device. Input unit 114 may detect the presence of a user's finger at a location corresponding to a UI control displayed at display device 112. Input unit 114 processes user actions, such as for example key selection from a virtual keyboard, button(s) or link(s) selection, etc. and may send a corresponding signal over communication channels 120 to another component in computing device 102.

Storage device 108 stores and records information or data, and may store information required for use during operation of computing device 102. Storage device 108, in some examples, has the primary purpose of being a short-term and not a long-term computer-readable storage medium. Storage device 108 may be volatile memory and therefore not retain stored contents if powered off. Examples of volatile memories include random access memories (RAM), dynamic random access memories (DRAM), static random access memories (SRAM), and other forms of volatile memories known in the art. Storage device 108 may further be configured for long-term storage of information such as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processor 104 reads and executes instructions stored by storage device 108.

Figure 2A:
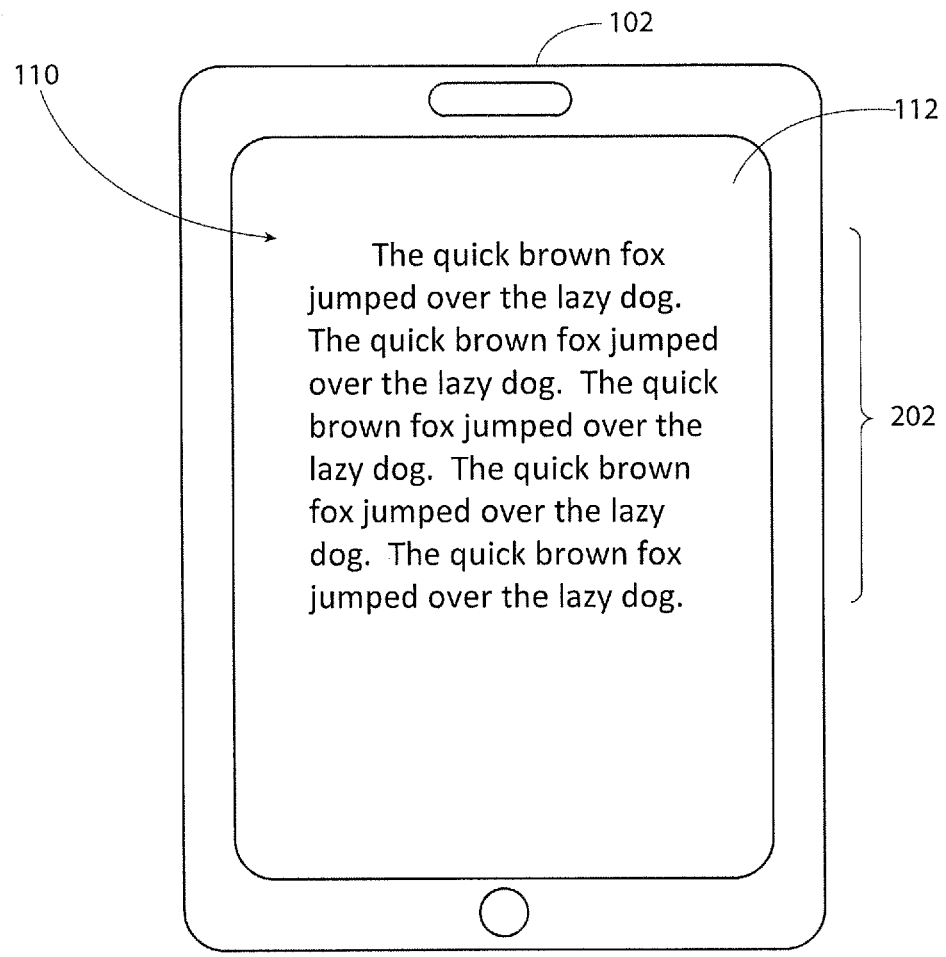
FIG. 2A is an example GUI including text that is selectable by a user, in accordance with one or more aspects of the present disclosure.

Storage device 108 includes a text selection module 116 and widget repositioning module 118. Text selection module 116 and widget repositioning module 118 provide an enhancement to text selection controls and assist the user in fine-tuning her text selection. FIG. 2A is an example GUI including text that is selectable by a user, in accordance with one or more aspects of the present disclosure. Computing device 102 may output GUI 110 for display at display device 112. GUI 110 includes one or more text strings, and each text string includes one or more characters.

III. Enhancements to Text Selection Controls

A. User Selects a Portion of Text

A user may select a portion of text 202 displayed at display device 112. The user may select text in a variety of ways. In some examples, the user presses down on display device 112 at a first location on GUI 110 that displays a first character in text 202. The first location may be between the words "The" and "quick" on line 4 of text 202 and may correspond to a begin widget that marks a first boundary of a user selected portion of text. The user may drag her finger while maintaining contact with display device 112 from the first location to a second location on GUI 110 that displays a second character subsequent to the first character in text 202. The second location may be between the words "lazy" and "dog" on line 6 of text 202 and may correspond to an end widget that marks a second boundary of the selected portion of text displayed at display device 112. If the second location precedes the first location in text 202 (e.g., the user drags her finger up and/or to the left of the first location), the second location corresponds to the begin widget that marks the first boundary of the selected portion of text and the first location corresponds to the end widget that marks the second boundary of the selected portion of text.

Input unit 114 detects the user's touch at the first location and the movement of the user's finger from the first location to the second location, and provides this information to text selection module 116. Text selection module 116 receives an indication of the detected movements and modifies, based on the indication, GUI 110 to include a begin widget and an end widget. The begin widget may be associated with the first location touched by the user, and the end widget may be associated with the second location. The portion of text selected by the user is disposed between the begin widget and end widget. Additionally, text selection module 116 may provide a visual indication that differentiates the selected text portion from the non-selected text portions.

Selected text portion 204 is visually differentiated from the non-selected portions of text 202. For example, in FIG. 2B, selected text portion 204 is highlighted, and the non-selected portions of text 202 are not highlighted. Other embodiments that visually indicate the selected text portions in different ways are within the scope of the present disclosure. For example, selected text portion 204 may be visually differentiated from non-selected portions of text 202 by underlining selected text portion 204, placing a box around selected text portion 204, or bolding selected text portion 204. It should also be understood that selected text portion 204 may be visually differentiated from the non-selected portions because the selected text portion is disposed begin widget 206 and end widget 208, which mark the boundaries of the user's selected text portion.

The user may select a portion of text displayed at display device 112 using a variety of techniques. In some examples, the user double taps on display device 112 at the first location corresponding to the begin widget (e.g., between the words "The" and "quick" on line 4 of text 202) and then double taps on display device 112 at the second location corresponding to the end widget (e.g., between the words "lazy" and "dog" on line 6 of text 202). Input unit 114 detects the user's double tap at the first location and the user's subsequent double tap at the second location, and provides this information to text selection module 116 to inform text selection module 116 that the user has selected text. Other user gestures or the presence of other objects (e.g., stylus) may be captured that indicate the user's text selection.

Figure 2B:
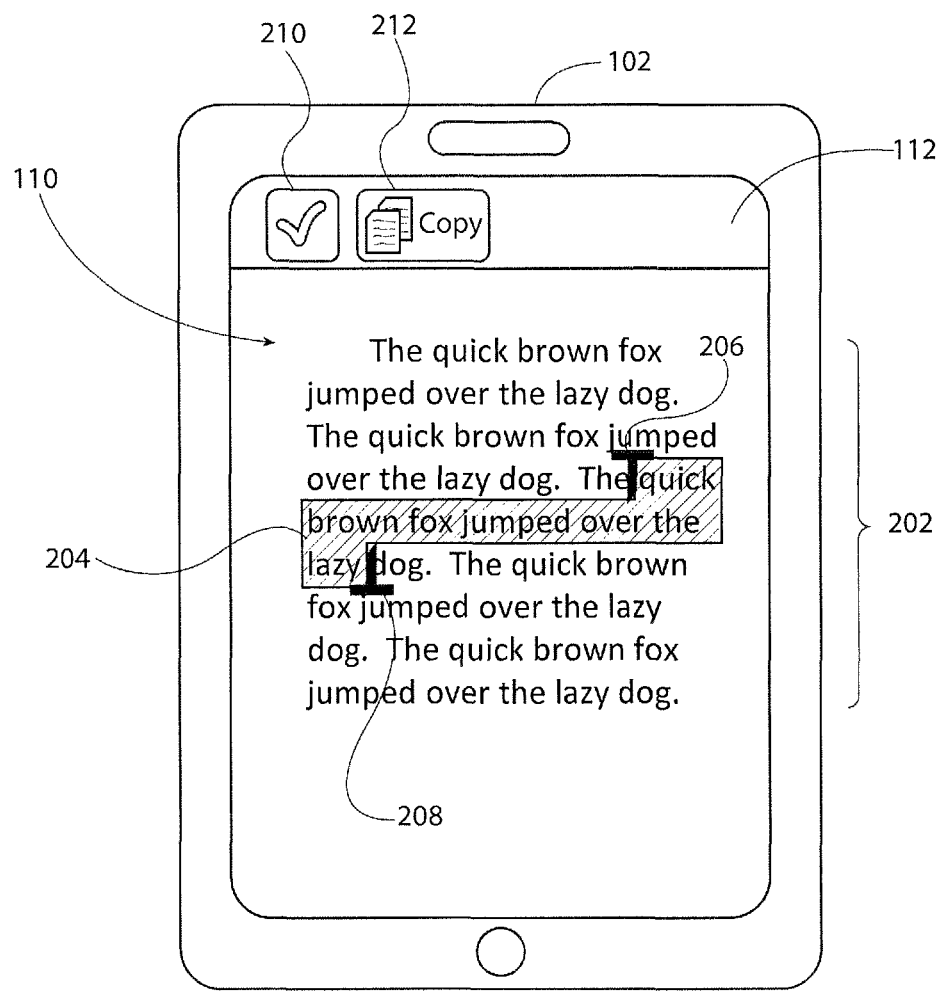
FIG. 2B is an example GUI including the user's selected text portion, in accordance with one or more aspects of the present disclosure.

If computing device 102 detects that the user is selecting or has selected a portion of text, computing device 102 may enter into a text selection mode. FIG. 2B is an example GUI including the user's selected text portion 204, in accordance with one or more aspects of the present disclosure. A begin widget 206 marks a start boundary of selected text portion 204, and an end widget 208 marks an end boundary of selected text portion 204. The user's selected text portion 204 is disposed between begin widget 206 and end widget 208. In some examples, an application executing on computing device 102 may modify GUI 110 (see FIG. 2A) to include begin widget 206 and end widget 208. Begin widget 206 is associated with the first letter of selected text portion 204, and may be displayed, for example, before, overlaid, above, and/or below the first letter of selected text portion 204. End widget 208 is associated with the last letter of selected text portion 204, and may be displayed, for example, before, overlaid, above, and/or below the last letter of selected text portion 204.

GUI 110 also includes icons 210 and 212. Icon 210 includes a check symbol that may be selected by the user to exit the text selection mode. The user may select an icon by, for example, double-tapping on the icon, tapping once on the icon, or touching a location on GUI 110 that displays the icon for a threshold amount of time. If the user selects icon 210, computing device 102 may exit the text selection mode and modify GUI 110 such that it no longer includes the visually differentiated text portion selected by the user. For example, if the user selects icon 210 in FIG. 2B, computing device 102 may output GUI 110 as shown in FIG. 2A, which does not visually differentiate a text portion selected by the user and also does not include begin widget 206 or end widget 208. The user may subsequently select a portion of text displayed at display device 112 in FIG. 2A and view the selected text portion at display device 112 (see FIG. 2B).

Icon 212 includes a copy symbol that may be selected by the user to copy the text portion selected by the user to a system clipboard. In some examples, if the user selects icon 212, an operating system (not shown) executing on computing device 102 copies selected text portion 204 and places it on the system clipboard. The system clipboard is an area of memory at which "copied" or "cut" text is stored. "Copied" text is a portion of text that the user requests to have copied to the system clipboard by, for example, selecting the copy symbol while computing device 102 is in the text selection mode and the portion of text is selected. "Cut" text is a portion of text that the user requests to have removed from GUI 110 and copied to the system clipboard by, for example, selecting the cut symbol while computing device 102 is in the text selection mode and the portion of text is selected. Subsequently, if the user selects a paste icon corresponding to a paste feature, the operating system retrieves selected text portion 204 from the area of memory to which the system clipboard maps and modifies GUI 110 to include selected text portion 204 at the current position of the cursor in the GUI. In an example, an application may display the text included in GUI 110 and the user may select an icon displayed on GUI 110 that causes the user's selected text portion to be copied to the system clipboard. In response to the user selecting the paste icon, the operating system may output the user's selected text portion into the same application or a different application, depending on the location of the cursor.

In some examples, icon 210 and/or icon 212 may be displayed at the top, bottom, left-hand side, right-hand side and/or center of an application window. Additional icons may be displayed that when selected by the user, perform other operations on the user's selected text portion. In an example, GUI 110 may include a cut icon including a scissor symbol that may be selected by the user to remove the text portion selected by the user and place it on the system clipboard. In another example, GUI 110 may include a define icon including a dictionary symbol that may be selected by the user to define the currently selected word. If the user selects the define icon, computing device 102 modifies GUI 110 by outputting the definition of the selected word in the GUI.

B. Fine-Tune Text Selection

The user may desire to perform an operation (e.g., copy, etc.) on the portion of text selected by the user. It may be difficult for the user to accurately select her desired text portion on the first try. For example, selected text portion 204 may include more or fewer characters than the user desires. In particular, the user may desire to fine-tune the text selection by adding one or more characters to and/or removing one or more characters from selected text portion 204.

In some examples, the user may drag begin widget 206 and/or end widget 208 to adjust the location of the appropriate widget and accordingly update the selected text portion. If the user drags a widget to adjust the text selection, the adjustment may be prone to error especially for zoomed-out views of the application's content. To fine tune the user's text selection, the user may pinch to zoom into the text, which may be a tedious task, especially if the text selection is large such that it may be difficult to fit the selected text in the zoomed-in view. Additionally, if the locations of begin widget 206 and end widget 208 are close together, it may be difficult for the user to select and drag the correct widget.

Moreover, it may be difficult for the user to modify selected text portion 204 because the text displayed at display device 112 may be small. For example, it may be cumbersome for the user to extend selected text portion 204 by only one character. If the user accidentally extends selected text portion 204 by two characters rather than one character, the user will make another attempt to adjust the selected text in order to remove that extra character. Additionally, it may be difficult for the user to select the correct line of text. Accordingly, it may be frustrating for the user to accurately select the portion of text that she desires.

To enhance the user's experience in selecting text on GUI 110 and displayed at display device 112, GUI 110 may be modified to include one or more extended areas including a set of UI controls associated with a widget. A UI control may be associated with an event handler that updates a location of the corresponding widget each time the UI control is selected. The selected text portion is disposed between the one or more updated widgets. A UI control may be used to fine-tune the selected text portion by adjusting the location of begin widget 206 or end widget 208.

The widgets may be opaque or semi-transparent. In some examples, a widget's corresponding extended area is transparent, semi-transparent or gradually fades to semi-transparent. It may be advantageous for an extended area to be semi-transparent so that the user is still able to continue reading text 202 and the extended area does not occlude the text displayed at display device 112. This is not intended to be limiting, and other embodiments in which an extended area is fully transparent or opaque is within the scope of the present disclosure. Additionally, an extended area may protrude from its associated widget. This is not intended to be limiting, and the shape of an extended area may vary along with its location on GUI 110. In some examples, if the user starts using one of the extended areas, the other extended area in GUI 110 may fade out so that it does not occupy the screen and distract the user.

Figure 2C:
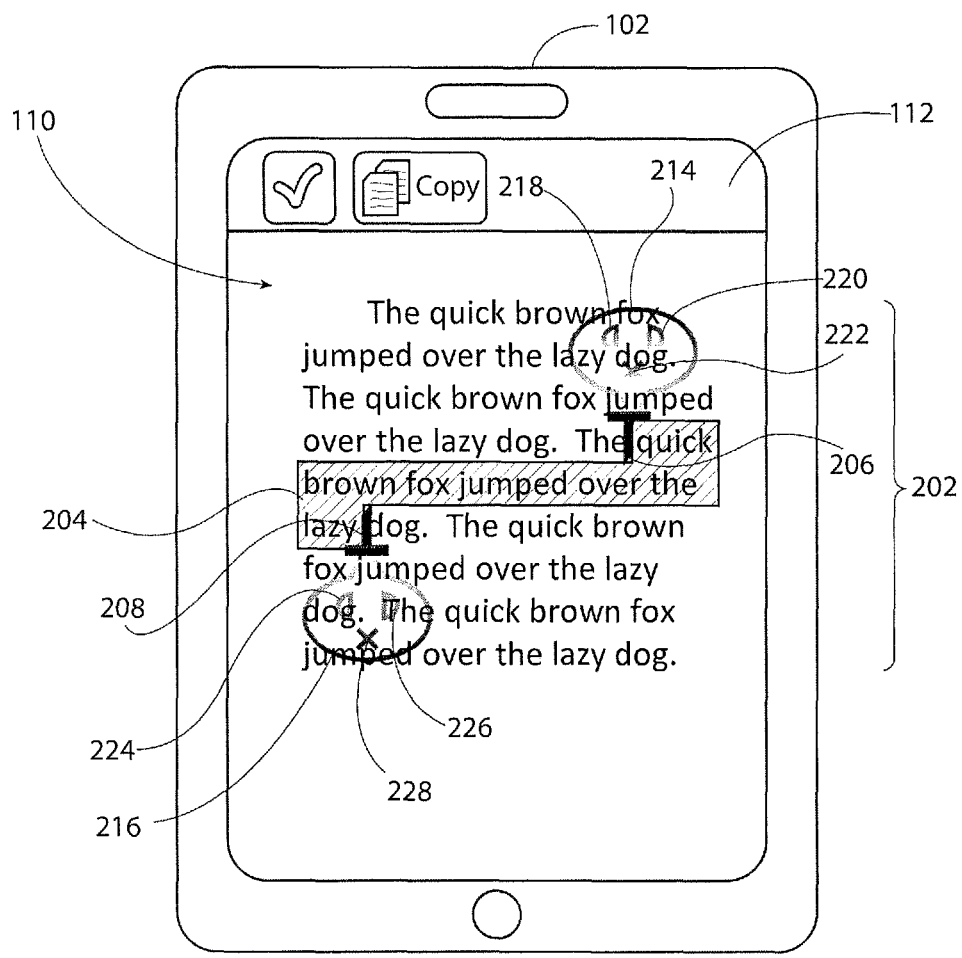
FIG. 2C is an example GUI including an extended area corresponding to a begin widget and an extended area corresponding to an end widget, in accordance with one or more aspects of the present disclosure.

FIG. 2C is an example GUI including an extended area 214 corresponding to begin widget 206 and an extended area 216 corresponding to end widget 208, in accordance with one or more aspects of the present disclosure. In FIG. 2C, extended area 214 is linked to begin widget 206, and extended area 216 is linked to end widget 208. Widget repositioning module 118 modifies GUI 110 by including extended area 214 and/or extended area 216 in the GUI. Widget repositioning module 118 may modify GUI 110 to include one or more extended areas based on a variety of reasons. For example, widget repositioning module 118 may modify GUI 110 to include an extended area in response to computing device 102 entering the text selection mode or in response to receiving an indication from input unit 114 that the user has touched a particular location on display device 112. The selection of a UI control may update the location of a widget, thereby extending or contracting the selected text portion.

Extended area 214 includes UI controls 218, 220, and 222, and extended area 216 includes UI controls 224, 226, and 228. UI controls 218 and 224 are illustrated as left arrow icons, UI controls 220 and 226 are illustrated as right arrow icons, and UI control 222 and 228 are illustrated as X-shaped icons. Although the extended areas are illustrated as including three UI controls, this is not intended to be limiting and an extended area may include one or more UI controls. Further, it should be understood that extended areas may have the same or a different number of UI controls. Additionally, the extended areas may include the same or different UI controls relative to each other.

A user may select a UI control by, for example, tapping, double tapping, or pressing down at a location on display device 112 that displays the UI control for a threshold of time (e.g., three seconds). In some examples, a UI control remains stationary relative to the extended area and/or the other UI controls while the user selects the UI control. Computing device 102 may receive the user's selection of a UI control while a position of the UI control at display device 112 remains constant relative to the extended area and/or the other UI controls. In this example, it may be unnecessary for the user to interact with the UI control and update a widget's location by moving the UI control from one location to another location in GUI 110. As such, the user may tap a single location multiple times to move a widget and thus update her text selection.

In this example, the extended areas provide a different manner for the user to update the locations of the widgets. An advantage of an embodiment may provide the user with a convenient way to update a widget's location on GUI 110. For example, it may be unnecessary for the user to firmly grasp computing device 102 to control the widget or a UI control by sliding it back and forth in order to update the widget's location on GUI 110. Rather, the user may conveniently tap one location on GUI 110 that displays the UI control corresponding to the widget that the user desires to relocate. For example, the user may glance at the selected text portion 204 and determine that three more letters should be added to the selected text portion. The user may walk or jog while conveniently tapping the same UI control on GUI 110 three times in order to update the appropriate widget's location without looking at the screen.

Based on the user's selection, GUI 110 may be modified such that the location of the widget corresponding to the selected UI control is moved. The user's finger may contact display device 112 at a location that displays the given UI control. Input unit 114 may detect the presence of the user's finger at a location on GUI 110 that displays the UI control. Responsive to the detection, input unit 114 may send an indication to widget repositioning module 118 that the user has selected the given UI control, which corresponds to a particular widget.

Widget repositioning module 118 may modify GUI 110 based on the user's selection of a UI control. Widget repositioning module 118 may update the location of a widget based on a user selecting the widget's corresponding UI control. In some examples, each selection of a UI control causes widget repositioning module 118 to update the location of the selected UI control's corresponding widget by N units, where N is a number greater than one. A unit may be, for example, a set of one or more characters, a set of one or more words, a set of one or more lines, or a set of one or more paragraphs.

Widget repositioning module 118 receives the indication that a given UI control has been selected and updates, based on the selection of the given UI control, a location of its corresponding widget as it is displayed on GUI 110. The selected text portion is updated and is disposed between begin widget 206 and end widget 208. The updated location of the widget may add one or more characters to or remove one or more characters from selected text portion 204. The selected text portion may be visually differentiated and displayed on GUI 110 at display device 112.

1. Extended Area Corresponding to the Begin Widget

In FIG. 2C, begin widget 206 is located between the words "The" and "quick" on line 4 of text 202. The user may want to include the first word in that sentence into selected text portion 204. As such, the user may want to adjust the location of begin widget 206 so that it precedes the word "The" on line 4 of text 202.

Begin widget 206 is associated with extended area 214, which includes UI controls 218, 220, and 222. UI control 218 updates a location of begin widget 206 to the left by N units, where N is a number. Accordingly, if the user selects UI control 218, N units are added to selected text portion 204. If the user touches a location on GUI 110 at which UI control 218 is displayed on display device 112, input unit 114 may detect the user's selection of UI control 218 and provide an indication of the user's selection of UI control 218 to widget repositioning module 118. Widget repositioning module 118 may receive the indication and modify GUI 110 such that begin widget 206 is moved to the left by N units of its current location in FIG. 2C. If N is one character, each user selection of UI control 218 causes widget repositioning module 118 to update the location of begin widget 206 by moving it one character to the left of its current location. It should be understood that a UI control may be configured to update the location of a widget by any number of units (e.g., a character, word, line, etc.).

Figure 2D:
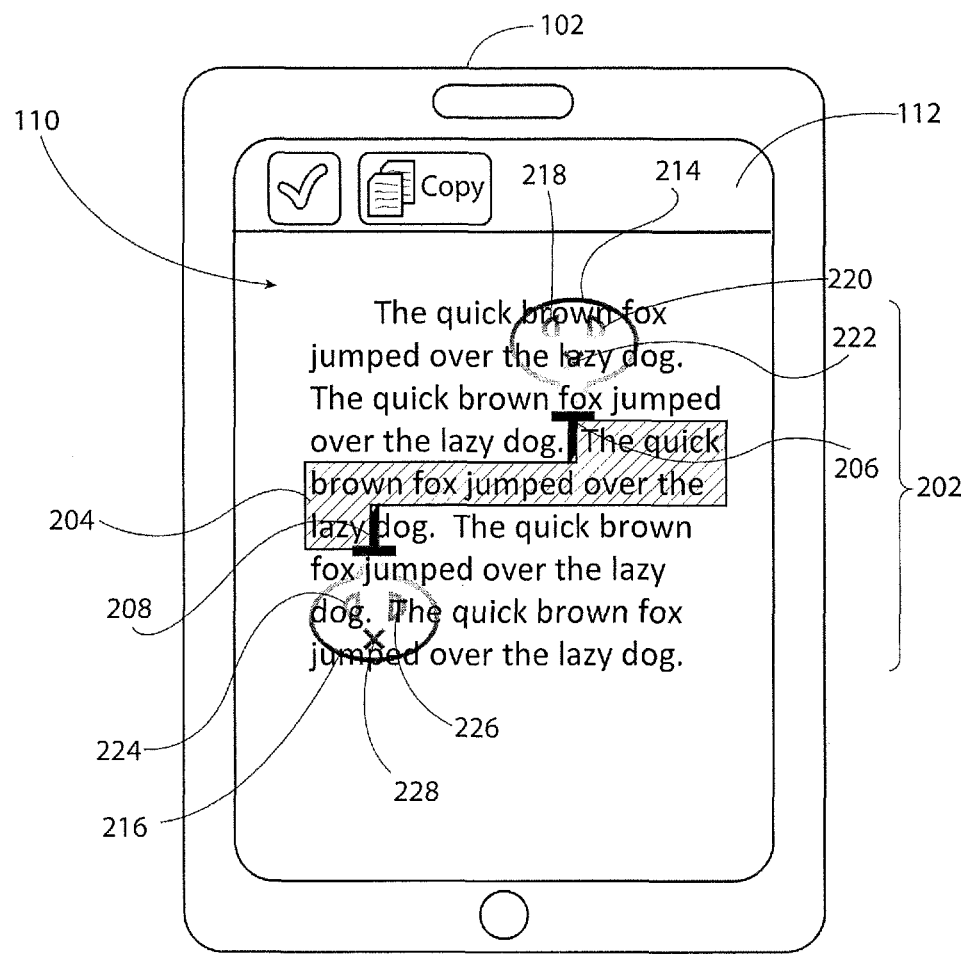
FIG. 2D is an example GUI including an updated location of the begin widget relative to FIG. 2C, in accordance with one or more aspects of the present disclosure.

FIG. 2D is an example of GUI 110 including an updated location of begin widget 206 relative to FIG. 2C, in accordance with one or more aspects of the present disclosure. In reference to FIG. 2C, after the user selects UI control 218 three times, widget repositioning module 118 may modify GUI 110 such that begin widget 206 precedes the word "The", which includes three characters, in line 4 of text 202. In FIG. 2D, the location of begin widget 206 has been updated three characters to the left from its location in FIG. 2C. The updated selected portion of text is disposed between begin widget 206 and end widget 208, and the movement of begin widget 206 updates the user's selected text portion. Based on the user selecting UI control 218 three times, selected text portion 204 has been updated to include three more characters to the left of begin widget 206's location in FIG. 2C. In particular, in FIG. 2D, updated selected text portion 204 includes the additional three characters "The" in line 4 of text 202.

UI control 220 updates a location of begin widget 206 to the right by M units, where M is a number. M and N may be different or the same, and their corresponding units may be different. If the user selects UI control 220, M units are removed from selected text portion 204. If the user touches a location on GUI 110 that displays UI control 220, input unit 114 may detect the user's selection of UI control 220 and provide an indication of the user's selection of UI control 220 to widget repositioning module 118. Widget repositioning module 118 may receive the indication and modify GUI 110 such that begin widget 206 is moved to the right by M units of its current location in FIG. 2D. If M is two lines, each user selection of UI control 220 causes widget repositioning module 118 to update the location of begin widget 206 by moving it two lines up from its current location.

Referring to FIG. 2D, if the user did not intend to select the word "The" in line 4 of text 202, the user may select UI control 220 three times. In response to the user selecting UI control 220 three times, widget repositioning module 118 may modify GUI 110 in FIG. 2D by updating the location of begin widget 206 one word to the right three times. FIG. 2C is an example of modified GUI 110 including an updated location of begin widget 206 relative to FIG. 2D after the user selects UI control 220 three times. After the user selects UI control 220 three times, widget repositioning module 118 may modify GUI 110 such that begin widget 206 is again located between the words "The" and "quick" in line 4 of text 202 (see FIG. 2C). The movement of begin widget 206 updates the user's selected text portion, which is disposed between begin widget 206 and end widget 208. In FIG. 2C, updated selected text portion 204 does not include the additional three characters "The" in line 4 of text 202 that was added to the selected text portion as shown in FIG. 2D.

Figure 2E:
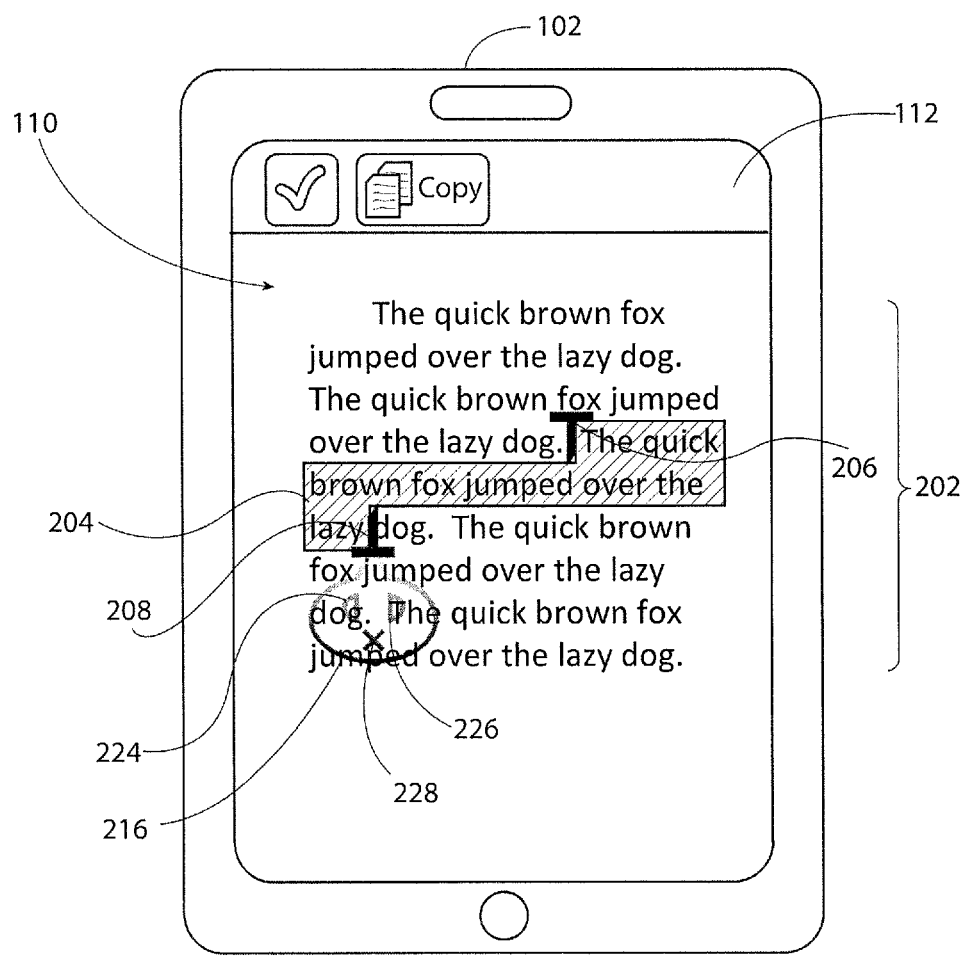
FIG. 2E is an example GUI including one extended area, in accordance with one or more aspects of the present disclosure.

Extended area 214 also includes UI control 222. In an example, if the user selects UI control 222, widget repositioning module 118 modifies GUI 110 to dismiss the extended area associated with the selected UI control. In this example, in response to the user selecting UI control 222, the modified GUI does not include extended area 214, but does include extended area 216. FIG. 2E is an example of GUI 110 including extended area 216, but not extended area 214, in accordance with one or more aspects of the present disclosure. The user may select UI control 222 if, for example, the user wants to drag begin widget 206 again but extended area 214 overlaps with the begin widget. After the user is finished dragging begin widget 206, widget repositioning module 118 may modify GUI 110 to include extended area 214. Accordingly, an extended area may disappear and re-appear based on the user's interaction with GUI 110.

In another example, if the user selects UI control 222, widget repositioning module 118 modifies GUI 110 to dismiss all the extended areas included in GUI 110. In this example, in response to the user selecting UI control 222, GUI 110 does not include extended area 214 or extended area 216. Based on the user's selection of UI control 222, widget repositioning module 118 may modify GUI 110 in FIG. 2D to look like the GUI illustrated in FIG. 2B.

2. Extended Area Corresponding to the End Widget

UI control 224 updates a location of end widget 208 to the left by P units, where P is a number. P may be the same as or different from N and M, and their corresponding units may be different. If the user selects UI control 224, P units are removed from selected text portion 204. If the user touches a location on GUI 110 that displays UI control 224, input unit 114 may detect the user's selection of UI control 224 and provide an indication of the user's selection of UI control 224 to widget repositioning module 118. Widget repositioning module 118 may receive the indication and modify GUI 110 such that end widget 208 is moved to the left by P units of its current location. If P is one character, each user selection of UI control 224 causes widget repositioning module 118 to update the location of end widget 208 by moving it one character to the left of its current location.

UI control 226 updates a location of end widget 208 to the right by Q units, where Q is a number. Q may be the same as or different from M, N, and P, and their corresponding units may be different. If the user selects UI control 226, Q units are added to selected text portion 204. If the user touches a location on GUI 110 that displays UI control 226, input unit 114 may detect the user's selection of UI control 226 and provide an indication of the user's selection of UI control 226 to widget repositioning module 118. Widget repositioning module 118 may receive the indication and modify GUI 110 such that end widget 208 is moved to the right by Q units of its current location. If Q is one character, each user selection of UI control 226 causes widget repositioning module 118 to update the location of end widget 208 by moving it one character to the right of its current location.

Figure 2F:
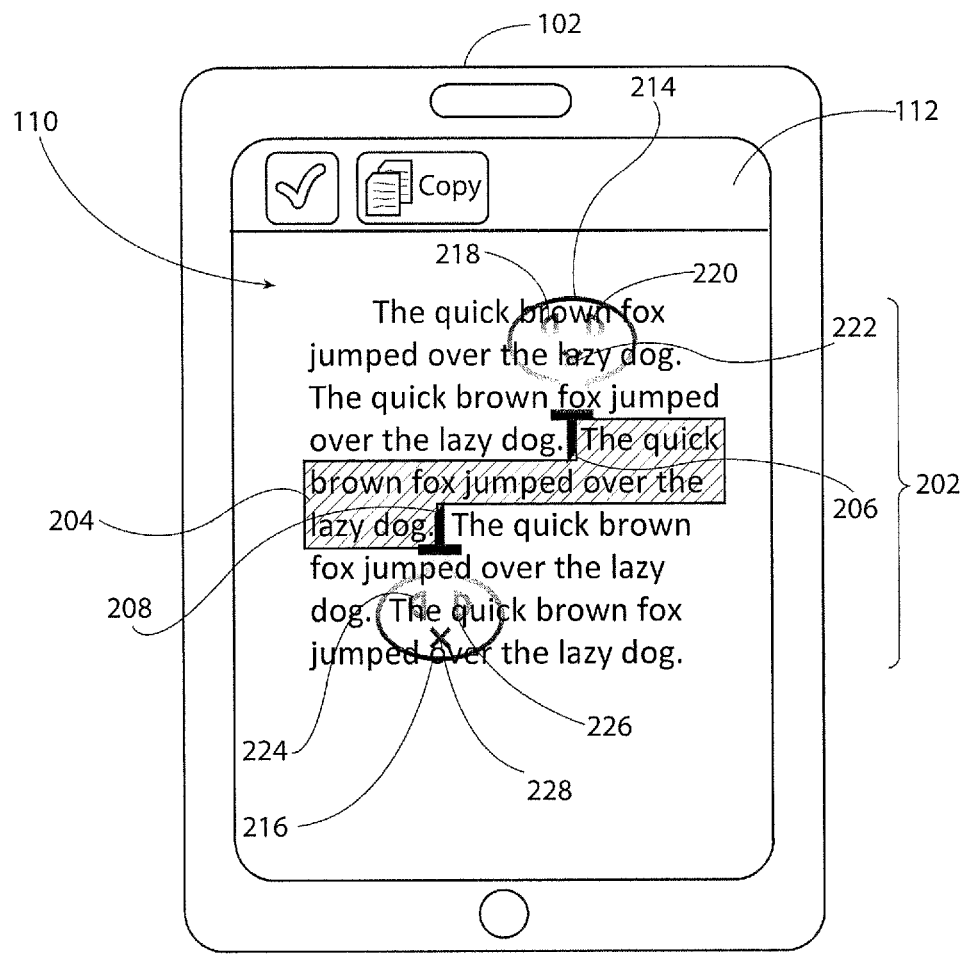
FIG. 2F is an example GUI including an updated location of the end widget relative to FIG. 2D, in accordance with one or more aspects of the present disclosure.

FIG. 2F is an example of GUI 110 including an updated location of end widget 208 relative to FIG. 2D, in accordance with one or more aspects of the present disclosure. In reference to FIG. 2D, after the user selects UI control 226 four times, widget repositioning module 118 may modify GUI 110 such that end widget 208 is located after the four characters "dog." in line 6 of text 202. In particular, end widget 208's updated location is between "dog," and "The" in line 6 of text 202. In FIG. 2F, the location of end widget 208 has been updated four characters to the right from its location in FIG. 2D. The movement of end widget 208 updates the user's selected text portion, which is disposed between begin widget 206 and end widget 208. In FIG. 2D, updated selected text portion 204 includes the additional four characters "dog." in line 6 of text 202.

If the user did not intend to include "dog." in selected text portion 204, the user may select UI control 224 four times. In response to the user selecting UI control 224 four times, widget repositioning module 118 may modify GUI 110 in FIG. 2F by updating the location of end widget 208 one character to the left four times. FIG. 2D is an example of modified GUI 110 including an updated location of end widget 208 relative to FIG. 2F after the user selects UI control 224 four times. After the user selects UI control 224 four times, widget repositioning module 118 may modify GUI 110 such that end widget 208 is again located between the words "lazy" and "dog" on line 6 of text 202 (see FIG. 2D). The movement of end widget 208 updates the user's selected text portion, which is disposed between begin widget 206 and end widget 208.

Extended area 216 also includes UI control 228. In an example, if the user selects UI control 228, widget repositioning module 118 modifies GUI 110 to dismiss the extended area associated with the selected UI control. In this example, in response to the user selecting UI control 228, the modified GUI does not include extended area 216, but does include extended area 214. The user may select UI control 228 if, for example, the user wants to drag end widget 208 again but extended area 216 overlaps with the end widget. After the user is finished dragging end widget 208, widget repositioning module 118 may modify GUI 110 to include extended area 216. Accordingly, an extended area may disappear and re-appear based on the user's interaction with GUI 110. In some examples, if the user drags begin widget 206 or end widget 208, the extended area associated with the dragged widget may disappear and then re-appear after the user releases the dragged widget.

The user may interact with GUI 110 to perform an operation on the updated selected text portion. For example, the user may select icon 212 to copy the updated selected text portion to the system clipboard, and reference the system clipboard to "paste" the updated selected text portion to another location on GUI 110 or into another application.

The location at which the extended areas are displayed on display device 112 may vary depending on, for example, the location of the extended area's corresponding widget and/or whether the extended area will fit on the screen. FIGS. 3A-3F are conceptual GUIs illustrating different locations at which extended areas may be displayed relative to their corresponding widgets, in accordance with one or more aspects of the present disclosure. A location at which an extended area is displayed on GUI 110 may be dependent on a location of the extended area's associated widget.

Figure 3A:
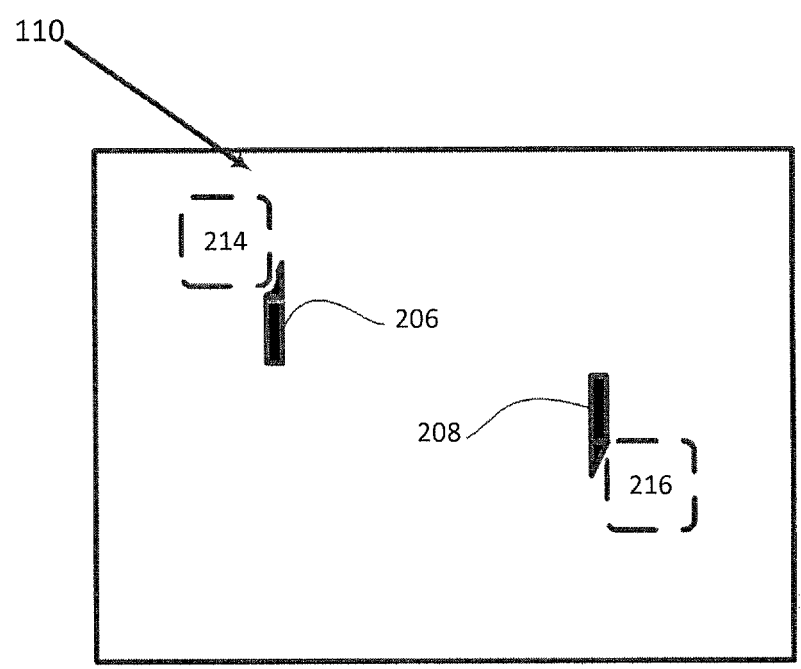
FIGS. 3A-3F are conceptual GUIs illustrating different locations at which extended areas may be displayed relative to their corresponding widgets, in accordance with one or more aspects of the present disclosure.

In FIG. 3A, GUI 110 includes begin widget 206 and end widget 208. Widget repositioning module 118 may display extended area 214 above and to the left of begin widget 206, and may display extended area 216 below and to the right of end widget 208. If the user drags begin widget 206 to the left near the side of the screen, it may be difficult to display extended area 214 on the screen without cutting off a portion of the extended area. Accordingly, widget repositioning module 118 may determine a location on GUI 110 at which to display extended area 214 such that it fits on the screen.

Figure 3B:
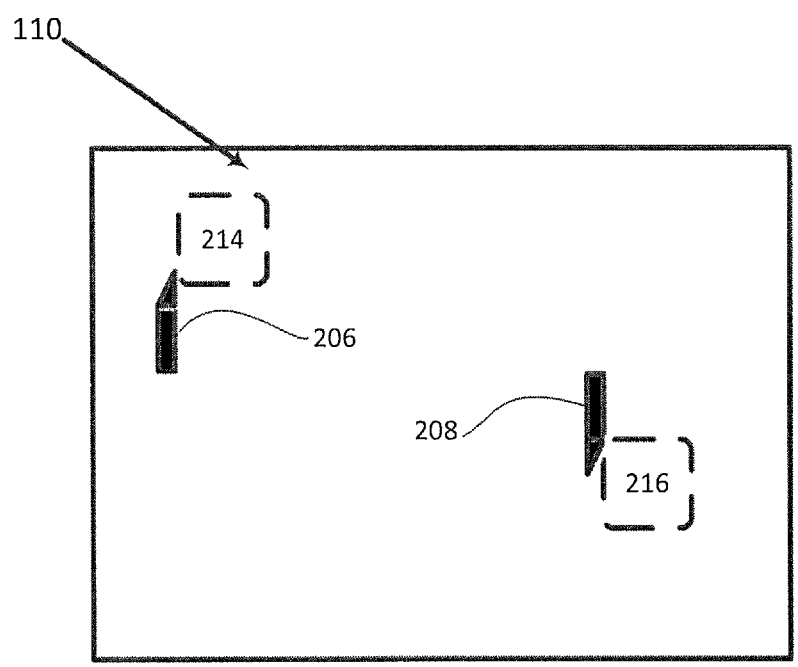

In FIG. 3B, GUI 110 includes extended area 214 displayed above and to the right of begin widget 206. If extended area 214 were to be displayed above and to the left of begin widget 206 in FIG. 3B, a portion of extended area 214 may be outside the view of the user. In some examples, widget repositioning module 118 may track the location of a widget on GUI 110 and determine the size of an extended area corresponding to the widget. For example, widget repositioning module 118 may compare the area of available space on GUI 110 above and to the left of begin widget 206 with the size of extended area 214. Widget repositioning module 118 may determine whether the corresponding widget fits into that area without cutting off any portion of extended area 214 from being displayed on the screen.

If the corresponding widget fits into that area without cutting off the extended area, widget repositioning module 118 modifies GUI 110 to include the extended area at that location. If the corresponding widget does not fit into that area without a portion of the extended area being cut off, widget repositioning module 118 determines a different location on GUI 110 at which to include extended area 214. In some examples, if extended area 214 fits above begin widget 206, widget repositioning module 118 modifies GUI 110 to include the extended area above begin widget 206. Additionally, if extended area 214 fits to the left of begin widget 206, widget repositioning module 118 modifies GUI 110 to include the extended area to the left of begin widget 206. If extended area 214 does not fit above begin widget 206, widget repositioning module 118 may modify GUI 110 such that the extended area is located below begin widget 206. If extended area 214 does not fit to the left of begin widget 206, widget repositioning module 118 may modify GUI 110 such that the extended area is located to the right of begin widget 206.

Widget repositioning module 118 may compare the area of available space on GUI 110 below and to the right of end widget 208 with the size of extended area 216. Widget repositioning module 118 may determine whether the corresponding widget fits into that area without cutting off any portion of extended area 216 from being displayed on the screen. If the corresponding widget fits into that area without cutting off the extended area, widget repositioning module 118 modifies GUI 110 to include the extended area at that location. If the corresponding widget does not fit into that area without a portion of the extended area being cut off, widget repositioning module 118 determines a different location on GUI 110 at which to include extended area 216. In some examples, if extended area 216 fits below end widget 208, widget repositioning module 118 modifies GUI 110 to include the extended area below end widget 208. Additionally, if extended area 216 fits to the right of end widget 208, widget repositioning module 118 modifies GUI 110 to include the extended area to the right of end widget 208. If extended area 216 does not fit below end widget 208, widget repositioning module 118 may modify GUI 110 such that the extended area is located above end widget 208. If extended area 214 does not fit to the right of end widget 208, widget repositioning module 118 may modify GUI 110 such that the extended area is located to the left of end widget 208.

Figure 3C:
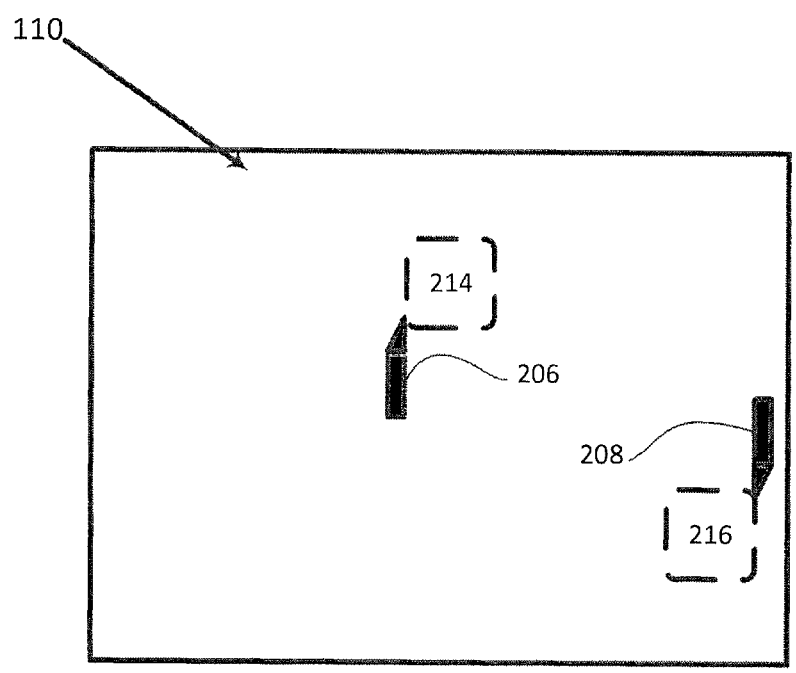

In FIG. 3C, GUI 110 includes extended area 216 displayed below and to the left of end widget 208. If extended area 216 were displayed to the right of end widget 208, a portion of extended area 216 may be cutoff and not viewable to the user.

Figure 3D:
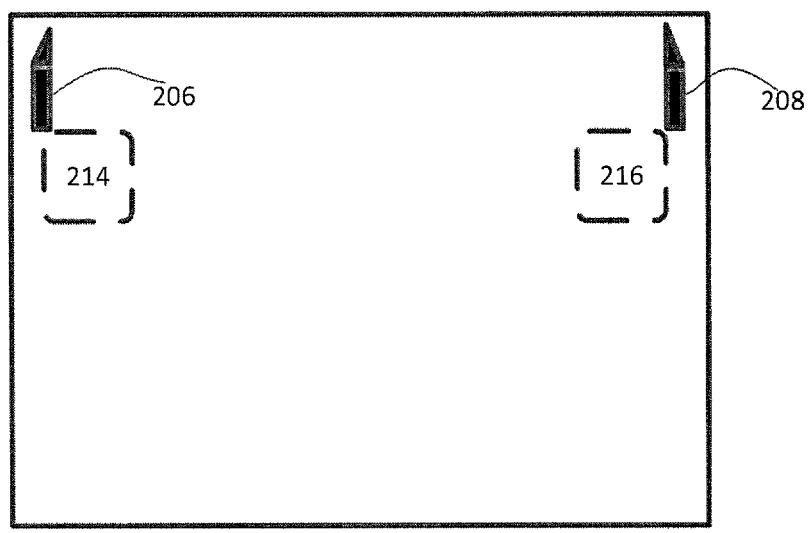
Figure 3E:
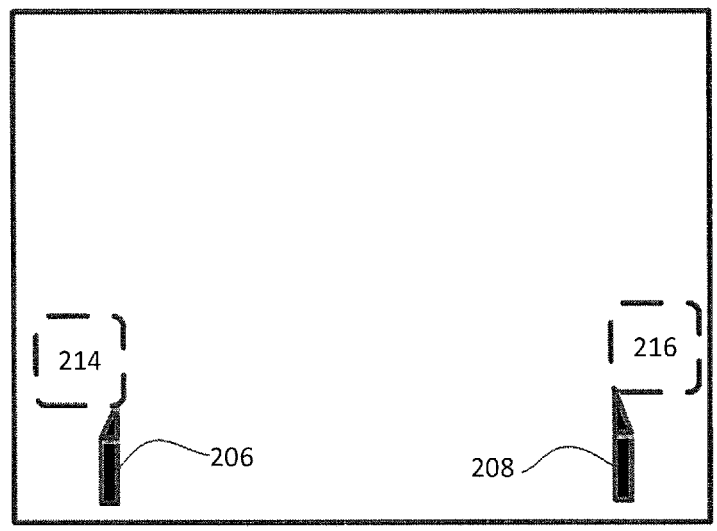
Figure 3F:
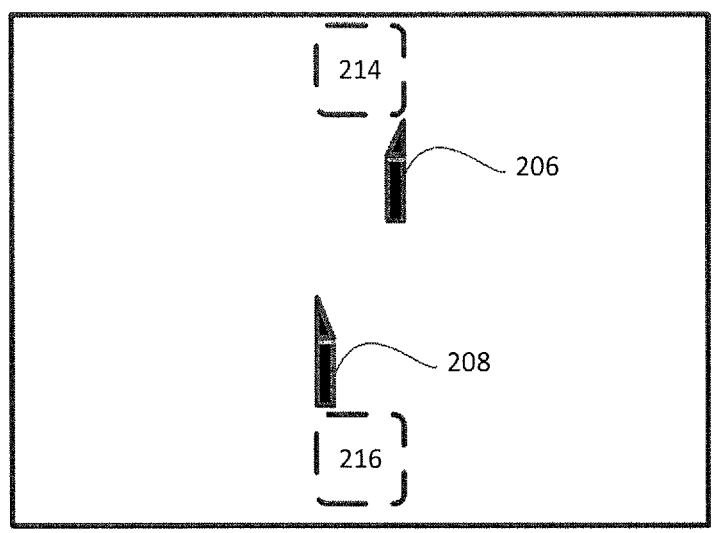

In FIG. 3D, GUI 110 includes extended area 214 displayed below and to the right of begin widget 206 and extended area 216 displayed below and to the left of end widget 208. In FIG. 3E, GUI 110 includes extended area 214 displayed above and to the left of begin widget 206 and extended area 216 displayed above and to the right of end widget 208. In FIG. 3F, GUI 110 includes extended area 214 displayed above and to the left of begin widget 206 and extended area 216 displayed below and to the right of end widget 208.

IV. Example Method

Figure 4:
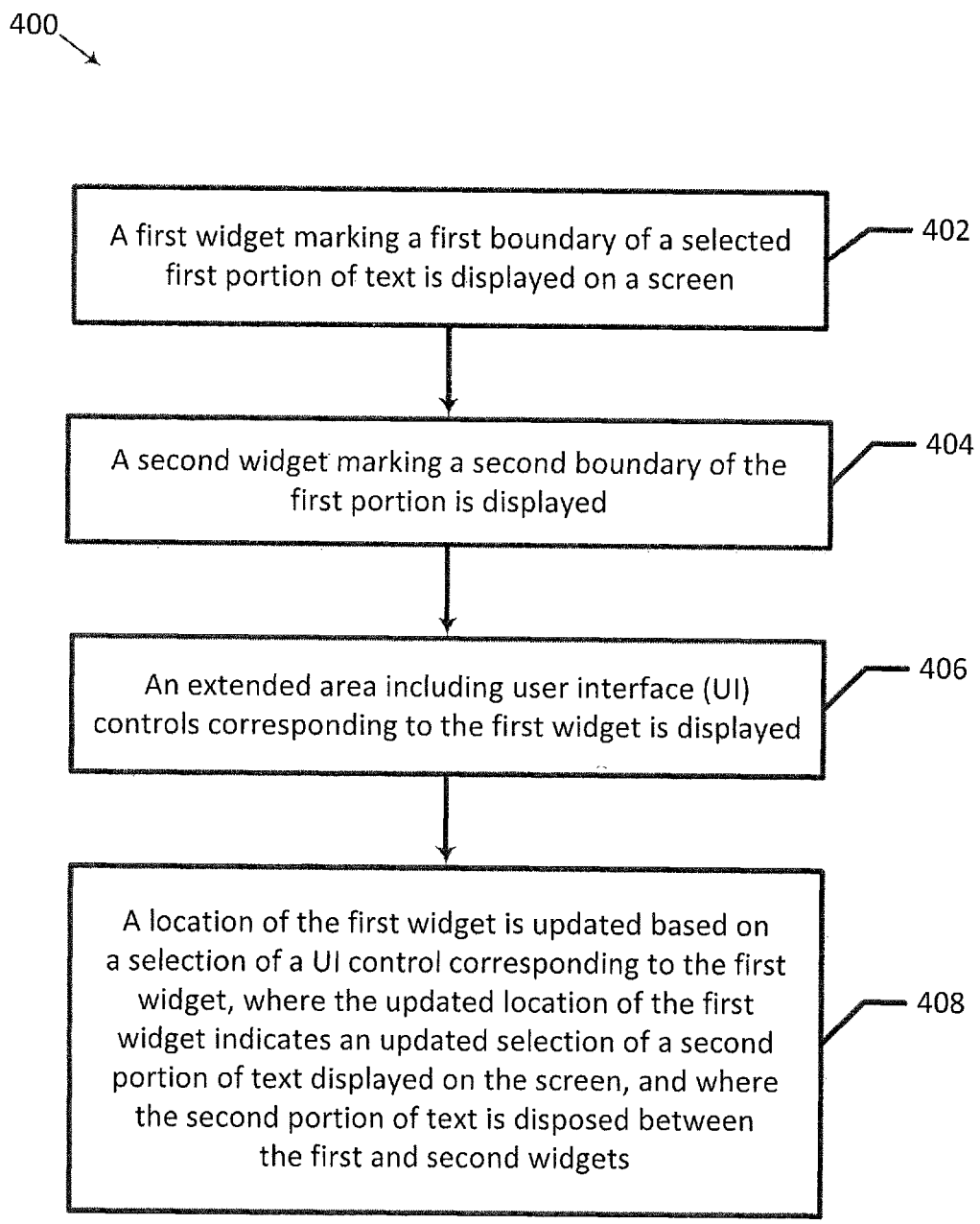
FIG. 4 is a flowchart illustrating a method of updating a user's selected portion of text displayed in a GUI, according to some embodiments.

FIG. 4 is a flowchart illustrating a method 400 of updating a user's selected portion of text, according to some embodiments. Method 400 is not meant to be limiting and may be used in other applications.

Method 400 includes blocks 402-408. In a block 402, a first widget marking a first boundary of a selected first portion of text is displayed on a screen. In an example, computing device 102 displays begin widget 206 marking a first boundary of selected text portion 204 at display device 112. In a block 404, a second widget marking a second boundary of the first portion is displayed. In an example, computing device 102 displays end widget 208 marking a second boundary of selected text portion 204. In a block 406, an extended area including UI controls corresponding to the first widget is displayed. In an example, computing device 102 outputs GUI 110 including extended area 214, which includes UI controls 218, 220, and 222 that correspond to begin widget 206.

In a block 408, a location of the first widget is updated based on a selection of a UI control corresponding to the first widget, where the updated location of the first widget indicates an updated selection of a second portion of text displayed on the screen, and where the second portion of text is disposed between the first and second widgets. In an example, computing device 102 updates, based on a selection of a UI control corresponding to begin widget 206, a location of begin widget 206 to indicate an updated selected text portion displayed at display device 112, where the updated portion of text is disposed between begin widget 206 and end widget 208. In another example, computing device 102 updates, based on a selection of a UI control corresponding to end widget 208, a location of end widget 208 to indicate an updated selected text portion displayed at display device 112, where the updated portion of text is disposed between begin widget 206 and end widget 208.

It is understood that additional processes may be performed before, during, or after blocks 402-408 discussed above. It is also understood that one or more of the blocks of method 400 described herein may be omitted, combined, or performed in a different sequence as illustrated in FIG. 4.

As discussed above and further emphasized here, FIGS. 1, 2A-2F, 3A-3F, and 4 are merely examples, which should not unduly limit the scope of the claims. In various embodiments of the present disclosure, execution of instruction sequences (e.g., blocks 402-408 in FIG. 4) to practice the present disclosure may be performed by computing device 102.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of updating a selected portion of text, comprising:
    displaying a first widget marking a first boundary of a selected first portion of text displayed on a screen;
    displaying a second widget marking a second boundary of the selected first portion of text;
    determining whether an extended area fits within a first area of the screen, the extended area including user interface (UI) controls corresponding to the first widget;
    in response to a determination that the extended area fits within the first area, displaying the extended area at the first area of the screen;
    in response to a determination that the extended area does not fit within the first area, displaying the extended area at a second area of the screen; and
    updating, based on a selection from within the extended area of a UI control corresponding to the first widget, a location of the first widget to indicate an updated selection of a second portion of text displayed on the screen, the second portion of text disposed between the first and second widgets.

2. The method of claim 1, wherein the UI control remains stationary relative to the extended area while a user selects the UI control.

3. The method of claim 1, further comprising:
    receiving the selection of the UI control while a position of the UI control on the screen remains constant relative to the extended area.

4. The method of claim 1, further comprising:
    displaying a second extended area including a second UI control corresponding to the second widget; and
    updating, based on a second selection from within the second extended area of the second UI control corresponding to the second widget, a location of the second widget to indicate an updated selection of a third portion of text displayed on the screen, the third portion of text disposed between the first and second widgets and different from the second portion of text.

5. The method of claim 1, wherein the extended area is semi-transparent, and the first widget is opaque.

6. The method of claim 1, wherein the extended area includes a first UI control corresponding to the first widget and a first direction, the method further comprising:
    receiving N selections of the first UI control, wherein N is a whole number greater than zero, and wherein updating the location of the first widget includes moving the first widget in the first direction by N units.

7. The method of claim 6, wherein a unit is a set of one or more characters, a set of one or more words, a set of one or more lines, or a set of one or more paragraphs.

8. The method of claim 6, wherein the N selections are different from a continuous motion that drags the first UI control.

9. The method of claim 6, wherein the extended area includes a second UI control corresponding to the first widget and a second direction different from the first direction, the method further comprising:
    receiving M selections of the second UI control, wherein M is a whole number greater than zero, wherein updating the location of the first widget includes moving the first widget in the second direction by M units, and wherein the M selections are different from a continuous motion that drags the second UI control across the screen.

10. The method of claim 9, further comprising:
    displaying a second extended area including a third UI control and a fourth UI control corresponding to the second widget, the third UI control corresponding to the first direction and the fourth UI control corresponding to the second direction; and
    updating, based on one or more selections from within the second extended area of at least one of the third UI control and the fourth UI control, a location of the second widget to indicate an updated selection of a third portion of text displayed on the screen, the third portion of text disposed between the first and second widgets.

11. The method of claim 10, further comprising:
    receiving P selections of the third UI control, wherein P is a whole number greater than zero, and wherein updating the location of the second widget includes moving the second widget in the first direction by P units; and
    receiving Q selections of the fourth UI control, wherein Q is a whole number greater than zero, and wherein updating the location of the second widget includes moving the second widget in the first direction by Q units.

12. A system for selecting text displayed on a screen, comprising:
    a display device;
    a memory; and
    one or more processors coupled to the memory and display device, wherein the one or more processors is configured to:
    display a second widget marking a second boundary of the selected first portion of text;
    determine whether an extended area fits within a first area of the screen, the extended area including user interface (UI) controls corresponding to the first widget;
    in response to a determination that the extended area fits within the first area, display the extended area at the first area of the screen;
    in response to a determination that the extended area does not fit within the first area, display the extended area at a second area of the screen; and
    update, based on a selection from within the extended area of a UI control corresponding to the first widget, a location of the first widget to indicate an updated selection of a second portion of text displayed on the screen, the second portion of text disposed between the first and second widgets.

13. The system of claim 12, wherein the UI control remains stationary relative to the extended area while a user selects the UI control, and wherein the one or more processors is configured to:
    receive the selection of the UI control while a position of the UI control on the screen remains constant relative to the extended area.

14. The system of claim 12, wherein the one or more processors is configured to:

display a second extended area including second UI controls corresponding to the second widget.

15. The system of claim 14, wherein the one or more processors is configured to:
update, based on a second selection from within the second extended area of a second UI control corresponding to the second widget, a location of the second widget to indicate an updated selection of a third portion of text displayed on the screen, the third portion of text disposed between the first and second widgets and different from the second portion of text.

16. A non-transitory computer-readable medium having stored thereon computer-executable instructions for performing operations, comprising:
displaying a first widget marking a first boundary of a selected first portion of text displayed on a screen;
displaying a second widget marking a second boundary of the selected first portion of text;
determining whether an extended area fits within a first area of the screen, the extended area including user interface (UI) controls corresponding to the first widget;
in response to a determination that the extended area fits within the first area, displaying the extended area at the first area of the screen;
in response to a determination that the extended area does not fit within the first area, displaying the extended area at a second area of the screen; and
updating, based on a selection from within the extended area of a UI control corresponding to the first widget, a location of the first widget to indicate an updated selection of a second portion of text displayed on the screen, the second portion of text disposed between the first and second widgets.

17. The computer-readable medium of claim 16, wherein the UI control remains stationary relative to the extended area while a user selects the UI control.

18. The computer-readable medium of claim 16, the operations further comprising:
receiving the selection of the UI control while a position of the UI control on the screen remains constant relative to the extended area.

19. The computer readable-medium of claim 16, the operations further comprising:
displaying a second extended area including second UI control corresponding to the second widget; and
updating, based on a second selection from within the second extended area of a second UI control corresponding to the second widget, a location of the second widget to indicate an updated selection of a third portion of text displayed on the screen, the third portion of text disposed between the first and second widgets and different from the second portion of text.

* * * * *